(12) United States Patent
Adachi et al.

(10) Patent No.: US 7,731,807 B2
(45) Date of Patent: Jun. 8, 2010

(54) STAINLESS STEEL SHEET FOR A GASKET

(75) Inventors: Kazuhiko Adachi, Amagasaki (JP);
 Masaru Abe, Chofu (JP); Takashi Katsurai, Utsunomiya (JP); Tadao Nishiyama, Utsunomiya (JP)

(73) Assignees: Sumitomo Metal Industries, Ltd., Osaka (JP); Honda Motor Co., Ltd., Tokyo (JP)

( * ) Notice: Subject to any disclaimer, the term of this patent is extended or adjusted under 35 U.S.C. 154(b) by 459 days.

(21) Appl. No.: 11/727,375

(22) Filed: Mar. 26, 2007

(65) Prior Publication Data

US 2007/0246127 A1 Oct. 25, 2007

Related U.S. Application Data

(63) Continuation of application No. PCT/JP2005/017476, filed on Sep. 22, 2005.

(30) Foreign Application Priority Data

Sep. 28, 2004 (JP) .............................. 2004-281709

(51) Int. Cl.
 *C23C 8/26* (2006.01)
(52) U.S. Cl. .................................................. 148/318
(58) Field of Classification Search ......... 148/228–233, 148/318, 325–327; 420/34–55, 60–70
 See application file for complete search history.

(56) References Cited

U.S. PATENT DOCUMENTS 7,520,942 B2 * 4/2009 Klueh et al. ................. 148/326

2002/0164259 A1 * 11/2002 Ishibashi et al. .............. 419/66

FOREIGN PATENT DOCUMENTS

| JP | 04-214841 | | 8/1992 |
|----|-----------|---|--------|
| JP | 05-117813 | | 5/1993 |
| JP | 05-279802 | | 10/1993 |
| JP | 11-241145 | | 9/1999 |
| JP | 2001-262287 | * | 9/2001 |
| JP | 2002-038243 | | 2/2002 |
| JP | 2003-082441 | | 3/2003 |
| JP | 2003-105502 | | 4/2003 |
| JP | 2004-099990 | | 4/2004 |
| WO | WO00/14292 | | 3/2000 |
| WO | WO 02/088410 A1 | | 11/2002 |

* cited by examiner

*Primary Examiner*—Deborah Yee
(74) *Attorney, Agent, or Firm*—Clark & Brody

(57) ABSTRACT

A high-performance stainless steel sheet which has a high strength which is optimal for a gasket for use in high-performance engines of automobiles and motorcycles and which also has excellent workability and fatigue properties and a method for its manufacture are provided.

At least in a region from the surface of the sheet up to 3 μm in the thickness direction, nitrogen compounds of at least 10 nm and at most 200 nm are present in an amount of at least 200 per 100 μm². The number of nitrogen compounds of at least 10 nm and at most 200 nm in a region from the sheet surface up to 3 μm in the thickness direction of the sheet is at least 2 times the number of nitrogen compounds of this size in the central portion of the sheet thickness.

5 Claims, 2 Drawing Sheets

(a)  (b)

(a)

(b)

STAINLESS STEEL SHEET FOR A GASKET

This application is a continuation of International Patent Application No. PCT/JP2005/017476, filed Sep. 22, 2005. This PCT application was not in English as published under PCT Article 21(2).

TECHNICAL FIELD

This invention relates to a stainless steel sheet having excellent workability and fatigue properties while maintaining a high strength. A steel sheet according to the present invention is suitable for a gasket for an engine of an automobile or a motorcycle.

BACKGROUND ART

An engine gasket for an automobile or a motorcycle is an important sealing member which is inserted between a cylinder head and a cylinder block and which prevents leakage of combustion gas, engine cooling water, and oil from between them (through the gap). The majority of gaskets used today have a structure comprising a plurality of stainless steel sheets which are stacked on each other. As can be seen from the test piece 10 shown in FIG. 1(a) which simulates a gasket, a projection called a bead 14 is formed in the shape of a ring in the periphery of a bore (a hole) 12 corresponding to the combustion chamber of an engine. FIG. 1(b) shows the cross-sectional shape and dimensions of the bead 14. Due to the contact (spring-back) force of this bead, it performs sealing of high pressure combustion gas and the like against repeated increases and decreases of the gap occurred during combustion. The cylinder head and the cylinder block are secured to each other by bolts.

In the past, materials such as JIS SUS301, 304, and 301L which are metastable austenite ($\gamma$) stainless steels specified by JIS G 4305 were widely used for gaskets. These steels are generally used after undergoing cold rolling (temper rolling) performed to adjust strength. A high strength can be obtained relatively easily due to a large amount of hardening caused by deformation-induced transformation into martensite ($\alpha'$). As a result of this large amount of hardening, deformation of undeformed portions having a small value of (strength×cross-sectional area) compared to deformed portions is promoted and the material is deformed as a whole with suppressed local deformation due to the so-called TRIP effect. A steel of this type is distinguished among stainless steels as having excellent workability. In addition, it exhibits the necessary corrosion resistance when contacted by cooling water.

However, in recent engines, due to environmental problems and the like, there has come to be a demand for both (i) higher compression ratios of fuel/gas mixtures and (ii) decreases in weight (reductions in size and higher densities) necessary to improve fuel consumption. There has also been a demand for both of these properties from users desiring an increase in output. In order to realize these demands, high strength and excellent ability to be worked into complicated shapes are simultaneously demanded of a gasket material.

However, even in stainless steels like those described above, in the same manner as with other metal materials, a degradation in workability accompanying an increase in strength is unavoidable, and at present it is not possible to adequately achieve both high strength and workability.

In the course of working to form a gasket, during bead formation, there was the problem that wrinkles, cracks (minute splits in the sheet surface), and the like occurred, and fatigue resistance ended up greatly decreasing. This will result in an engine, in which at the time of repeated increases and decreases in the gap between the cylinder head and the cylinder block due to combustion, the bead portion of the gasket undergoes fatigue failure at an early stage with the above-described defects as starting points, and the fatigue failure becomes a cause of problems such as the sealing ability becoming inadequate, a decrease in fuel efficiency and output, and pollution of the atmosphere. In the worst case, the fatigue failure may become a cause of engine failure or damage.

Patent Documents 1, 2, 3, and 4 disclose materials having improved fatigue properties and methods for their manufacture. According to these materials and methods, the crystal grain diameter of a gasket material is refined to greatly inhibit the formation of defects which are thought to be formed primarily at crystal grain boundaries at the time of bead formation while maintaining a high strength equal to that of earlier materials. Such conventional materials refine the crystal grains by final annealing and thereby aim at an increase in strength, and they achieve the necessary strength by a synergistic effect of work hardening during temper rolling which is subsequently carried out. Namely, with such conventional materials, after final annealing is carried out to refine the crystal grains in the above manner, temper rolling is further carried out to form a product sheet, and then the product sheet is worked to form a gasket.

However, since annealing to be carried out for refining crystal grains must be carried out at a relatively low temperature and in a narrow temperature range, compared to conventional high temperature annealing having the primary object of softening, it has the problems that it is difficult to obtain a stable structure and that control is difficult.

Patent Document 1: Japanese Published Unexamined Patent Application Hei 4-214841

Patent Document 2: Japanese Published Unexamined Patent Application Hei 5-279802

Patent Document 3: Japanese Published Unexamined Patent Application Hei 5-117813

Patent Document 4: WO 00/14292

DISCLOSURE OF THE INVENTION

Problem which the Invention is to Solve

This invention provides a stainless steel sheet which has high strength as well as excellent workability and fatigue properties and a method for its manufacture. A steel sheet according to the present invention is optimal for a gasket for recent high-performance engines of automobiles and motorcycles. The present invention aims at stable supply thereof on an industrial scale. In other words, it has the object of stably providing a high-performance gasket for high-reliability engines having low fuel consumption which can cope with environmental problems and the like.

With typical metal materials, it was impossible to avoid deterioration of workability with an increase in strength, and it was thought that strength and workability could not be both achieved. However, the present invention provides a gasket material having both high strength and excellent workability as well as excellent fatigue properties and a method for its manufacture.

Means for Solving the Problem

The present inventors conceived that if strength is increased by refining the crystal grain diameter in the matrix of a steel sheet and if the occurrence of defects at the time of bead formation can be greatly suppressed by dispersion of deformation in the grain boundaries due to an increase in the grain boundary density, excellent workability and fatigue properties can be achieved while maintaining the high strength necessary for a gasket material. Namely, fundamentally, in the same manner as in the past, a structure with refined crystal grains is utilized. As a result of diligent investigations on optimizing and stably obtaining this structure, they perceived the following.

(a) It is thought that if the crystal grains of the matrix of a steel sheet are refined in the vicinity of the sheet surface where the amount of deformation is a maximum, even if the interior has a certain amount of coarse grains, the material will still exhibit excellent properties.

(b) Absorption of nitrogen (solid solution and diffusion) from the surface of a steel sheet and precipitation of nitrogen compounds (nitrides) which are observed when a series of heat treatments (two heat treatments) is applied are effective for crystal grain refinement in the vicinity of the surface. Namely, it is thought that grain growth is suppressed by uniform dispersion of minute precipitates during heat treatment, and that crystal grain refinement in the vicinity of the surface of a sheet can be effectively realized.

In connection with (a), if precipitates are fine and if their concentration (number) continuously decreases in the direction of the sheet thickness, it is expected that no distinct discontinuity of change in size is formed and that the formation of new defects is not promoted at the time of bead formation or at the time of gasket use.

The present invention is based on the above-described concept. As a result of further diligent research aimed at solving the problem, the following was discovered and the present invention was completed.

(i) In order to suppress the formation of defects such as cracks and wrinkles at the time of bead formation to attain both a high strength and excellent workability and thereby attain good fatigue properties, it is effective to refine the crystal grain of the matrix of the steel sheet in the vicinity of the sheet surface.

(ii) If heat treatment is carried out in a high-purity nitrogen gas atmosphere having a low dew point or a nitrogen-containing reducing gas atmosphere having a low dew point, absorption of nitrogen occurs, and if heat treatment at a low temperature is carried out, precipitation of nitrides occurs.

(iii) By combination of the above-described heat treatment conditions, minute nitrides are uniformly dispersed in the vicinity of the surface of a sheet and grain growth of the matrix of the steel sheet is effectively suppressed, and compared to the interior, a structure with a refined grain size is obtained. By realizing such a structure, both a high strength and excellent workability can be achieved.

(iv) Fatigue properties after working to form a gasket are improved by using a steel sheet having the above-described structure.

Here, the present invention is as follows.

(1) An austenitic stainless steel sheet for a gasket characterized that at least in a region from the surface of the sheet up to 3 µm in the thickness direction of the sheet, nitrogen compounds having a diameter of at least 10 nm and at most 200 nm are present in an amount of at least 200 per 100 µm$^2$.

(2) An austenitic stainless steel sheet for a gasket as set forth above in (1) characterized in that the number of nitrogen compounds having a diameter of at least 10 nm and at most 200 nm per 100 µm$^2$ in a region from the surface of the sheet up to 3 µm in the thickness direction of the sheet is at least two times the number of nitrogen compounds of this size in the central portion of the sheet thickness.

(3) An austenitic stainless steel sheet for a gasket as set forth above in (1) or (2) characterized in that the grain size number of the steel sheet matrix in a region from the surface of the sheet up to 3 µm in the thickness direction of the sheet is at least 1 greater than the grain size number in the central portion of the sheet thickness.

(4) An austenitic stainless steel sheet for a gasket as set forth above in (3) characterized in that the grain size number of the steel sheet matrix in a region from the surface of the sheet up to 3 µm in the thickness direction of the sheet is at least 11.

(5) An austenitic stainless steel sheet for a gasket as set forth above in any of (1) through (4) characterized in that the structure making up the steel sheet is a worked structure.

(6) An austenitic stainless steel sheet for a gasket as set forth above in any of (1)-(5) characterized in that the steel composition of the steel sheet is a composition corresponding to SUS301, SUS304, SUS301L, or SUS304L steel.

(7) An austenitic stainless steel sheet for a gasket as set forth above in (6) characterized by further including at least one of Ti, Nb, and V in a total amount of 0.02-0.5 mass %.

(8) A method of manufacturing an austenitic stainless steel sheet for a gasket including the step of annealing a cold rolled steel sheet, characterized in that the step of annealing includes the following steps:

(i) a step of annealing for at least 20 seconds in a temperature range of 1000-1200° C. in an atmosphere containing at least 5 volume % of nitrogen and having a dew point of −40° C. or below, and (ii) a step of annealing at a temperature at least 50° C. lower than the heat treatment temperature after carrying out the heat treatment.

(9) A method of manufacturing an austenitic stainless steel sheet for a gasket as set forth above in (8) characterized by carrying out cold rolling between each step in which annealing is performed.

(10) A method of manufacturing an austenitic stainless steel sheet for a gasket as set forth above in (8) or (9) characterized by carrying out temper rolling after the step of annealing at a low temperature.

(11) A gasket made from a stainless steel sheet as set forth above in any of (1)-(7).

EFFECTS OF THE INVENTION

In the present invention, a series of heat treatments having the primary objects of absorbing nitrogen and precipitation, respectively, are carried out, and the crystal grains are refined in the vicinity of the sheet surface where the amount of deformation is a maximum.

In addition, in the present invention, a structure can be obtained which does not form coarse precipitates which have the possibility of generating new defects or the origins of discontinuous boundaries in a fatigue environment at the time of working to form a gasket or when it is mounted on an engine. This is because the pinning effect due to the presence of precipitates is utilized most advantageously, fine nitrides formed by refining crystal grains are dispersed uniformly and with a high concentration in the vicinity of the sheet surface, and their concentration continuously decreases in the thickness direction of the sheet.

Thus, according to the present invention, a stainless steel sheet which has excellent workability and fatigue properties while maintaining a high strength which is optimal for a gasket for an engine of an automobile or a motorcycle can be provided inexpensively and stably on an industrial scale. As a result, a high-performance gasket having low fuel consumption and high reliability which can cope with recent environmental problems and user needs (higher output) can be stably supplied.

BRIEF EXPLANATION OF THE DRAWINGS

FIG. 1(a) is a schematic view showing a test piece which simulates a gasket, and FIG. 1(b) is a schematic view showing the dimensions of a cross section.

FIGS. 3(a) and 3(b) are TEM structural photographs of the central portion in the thickness direction and the vicinity of the sheet surface, respectively, of inventive material 11 of Table 3 after final heat treatment.

BEST MODE FOR CARRYING OUT THE INVENTION

Figure 1:
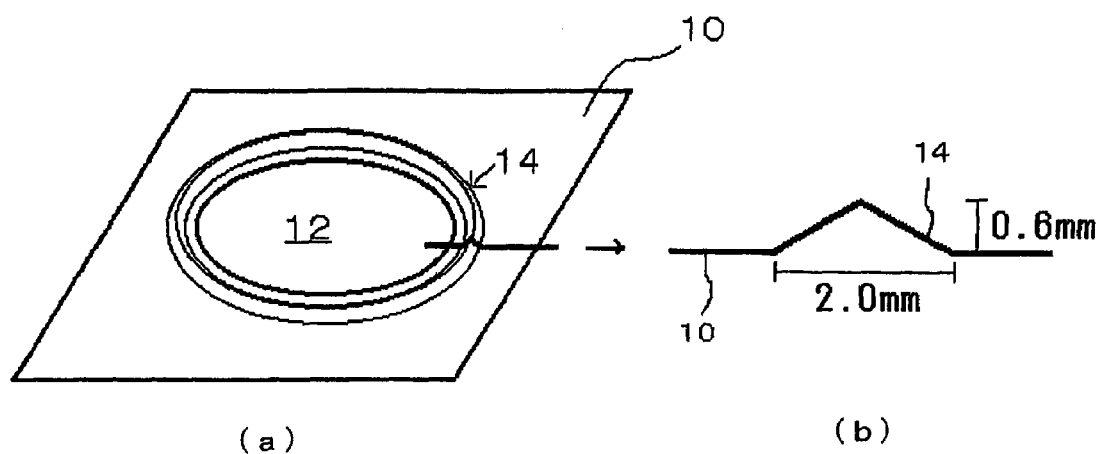
FIG. 1.

The reasons why the present invention is limited as described above will be explained more concretely.

A steel sheet used in the present invention may be made of a stainless steel having a composition corresponding to conventionally used SUS301, SUS304, SUS301L, and SUS304L specified by JIS G 4305, and there are no particular restrictions thereon. Preferably, however, in order to precipitate nitrides which are thought to be particularly effective for suppressing grain growth, it preferably contains a minute amount of at least one of Ti, Nb, and V. Here, a minute amount refers to a total of at most 0.5 mass percent of the at least one substance. Preferably it is at least 0.02 mass percent. More preferably, it is at least 0.03 mass percent and at most 0.4 mass percent.

According to the present invention, nitrogen compounds are present in the surface portion of such a steel sheet. The nitrogen compounds at this time are ones which are derived from nitrogen, the principal portion of which penetrates into the steel sheet from the exterior and particularly from the atmosphere. Compared to nitrides which are derived from the nitrogen dissolved in a molten steel at the time of melting of steel, they are more concentrated in the surface of a steel sheet. Formation of nitrogen compounds in such a surface layer portion occurs in the following manner.

First, it is thought that the region in which nitrides disperse and crystal grains are refined corresponds to the depth of penetration of nitrogen which is absorbed during a series of heat treatments. The depth of nitrogen penetration in a test near the lower limit conditions (1000° C.×holding for 30 seconds) which was carried out as conditions corresponding to continuous annealing treatment of a steel sheet in an industrial production line was around 20 μm. However, the region can be confirmed after final heat treatment where nitrides are dispersed and crystal grains are refined.

As shown in below-described Table 2, a product sheet typically undergoes pre-heat treatment followed by intermediate rolling, final heat treatment, and then temper rolling.

The depth of nitrogen penetration in the above region after each step is thought to decrease in accordance with the rolling reduction. Namely, when the depth of nitrogen penetration is 20 μm at the time of pre-heat treatment, in an actual production step similar to this test, it is 8.3 μm after intermediate rolling (reduction of 58.3%, sheet thickness is reduced from 1.2 mm to 0.5 mm) and final heat treatment, and it becomes 3.3 μm after temper rolling (reduction of 60%, by rolling to a sheet thickness of 0.2 mm). Accordingly, in the present invention, the lower limit of the surface layer in which nitrogen compounds are present is made at least 3 μm. More preferably, it is at least 4 μm. Namely, it prescribes the presence of nitrogen compound in the region "at least from the surface of the sheet up to 3 μm in the thickness direction of the sheet" and preferably "from the sheet surface up to 4 μm in the thickness direction of the sheet".

Here, the sheet thickness of a stainless sheet for a gasket is usually around 0.1-0.4 mm.

Considering the case in which heat treatment is performed on an industrial production line, under heat treatment conditions at the upper limit at this time (1200° C.×600 seconds), the depth of penetration (Nt) due to diffusion of nitrogen is calculated as follows.

$$Nt=(2Dt)^{1/2}\approx(2\times2\times10^{-6}\times600)^{1/2}=489.9 \text{ μm}$$

D: diffusion constant of nitrogen in γ steel (approximately $2\times10^{-6}$ cm²/second at 1200° C.)

t: holding time (seconds)

Accordingly, it is assumed that the limit (maximum) of the depth of nitrogen penetration is around 500 μm. However, the thickness of the nitrogen absorption layer which was ascertained after actual pre-heat treatment under conditions corresponding to actual manufacturing conditions was only about 200 μm.

Figure 2:
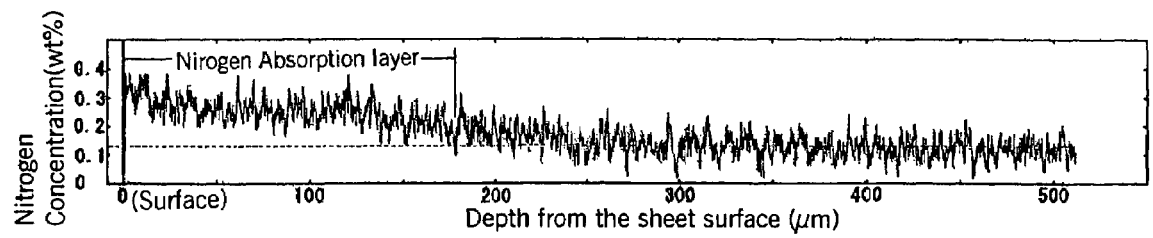
FIG. 2: This is a graph showing the results of analysis using an EPMA of the nitrogen content from the sheet surface towards the central portion of inventive material 11 of Table 3 after pre-heat treatment.

FIG. 2, which will be described below, is a graph showing the distribution from the sheet surface in the thickness direction of the sheet of the concentration of nitrogen absorbed from the surrounding atmosphere by heat treatment according to the present invention. It can be seen that the thickness of the nitrogen absorption layer is nearly 200 μm. It is thought that the reason why actual nitrogen absorption stops at a thickness of 200 μm in this manner is because an oxide film, surface contamination, and the like become an impediment to diffusion.

In this manner, when the heat treatment depth is 200 μm, the depth after working like that described above becomes 33 μm. As a result, the upper limit with respect to a sheet thickness of 0.2 mm is approximately 33 μm from both surfaces. When the proportion represented by the region of nitride precipitation is extremely large, there is concern of embrittlement of the material, but since from these actual results, it is thought to be no particular problem, an upper limit is not set.

Nitrides are primarily those which are formed at the time of final annealing by precipitation of nitrogen which was absorbed during pre-heat treatment. They are preferably fine. The reason why the upper limit on the diameter of nitrides is made at most 200 nm is because when this value is exceeded, there is an increased possibility of defects forming. More preferably, it is at most 150 nm. In order to distinguish nitrides which precipitate from a solid solution of nitrogen in steel during a series of heat treatments from those resulting from absorbed nitrogen, the lower limit on the diameter of the nitrides of interest is made at least 10 nm. Preferably it is at least 15 nm and still more preferably at least 20 nm. Here, "diameter" of nitrides is the average of the maximum diameter and the minimum diameter of one nitride grain.

The nitrides are preferably present with a high density in the vicinity of the sheet surface and the concentration thereof continuously decreases. Considering cases in which the crystal grain refining effect was actually obtained, it is determined that the number of nitrides having a diameter of the above-described size is at least 200 per 100 $\mu m^2$. It is more preferably at least 300. According to a preferred embodiment of the present invention, the concentration within 3 $\mu m$ or within 4 $\mu m$ in the thickness direction of the sheet in the vicinity of the sheet surface is made at least two times that at the central portion of the sheet thickness. This is because the effect (crystal grain refining) can be achieved and the concentration difference can be visually observed in such an embodiment. Preferably it is at least three times.

The crystal grains in the vicinity of the sheet surface need to be fine. This is a main cause of improvement in workability of the material and accompanying improvements in fatigue properties. The more refined crystal grains are preferably the better. The reason why the crystal grain diameter in the vicinity of the sheet surface in which nitrides are dispersed is made equal to or finer than grain size number 1 ($2^{-1/2} \times$ the crystal grain diameter), as defined by JIS G 0551, compared to that at the central portion of the sheet thickness is that the difference can be visually observed and effects (improvement in workability and fatigue properties) can be obtained in such a case. More preferably, it is made at least grain size number 2 ($\frac{1}{2}$ times the grain diameter).

In addition, the grain size number at the central portion of the sheet thickness inside the sheet is made at least 11 (a grain diameter of at most approximately 8.8 $\mu m$) due to experimental results in which a further improvement in fatigue properties was ascertained. More preferably, the grain size is at least 14 (a grain diameter of at most approximately 3.1 $\mu m$).

As already stated, the most important point in the present invention is that the crystal grains in the matrix in the vicinity of the sheet surface are refined due to the uniform distribution of fine nitrides after final annealing.

As reference data, line analysis of nitrogen (the concentration distribution in the thickness direction of the sheet) obtained by an EPMA (electron probe microanalyzer) of inventive material 11 after the below-described pre-heat treatment of Table 3 is shown in FIG. 2. The structure observed with a transmission electron microscope (TEM) in the vicinity of the sheet surface and at the central portion of the sheet thickness of the same material after carrying out final annealing is shown in FIG. 3.

From FIG. 2, it can be seen that when treatment is performed under conditions corresponding to pre-heat treatment conditions in an actual manufacturing line, the nitrogen concentration up to about 200 $\mu m$ from the sheet surface is high compared to the interior thereof.

Figure 3:
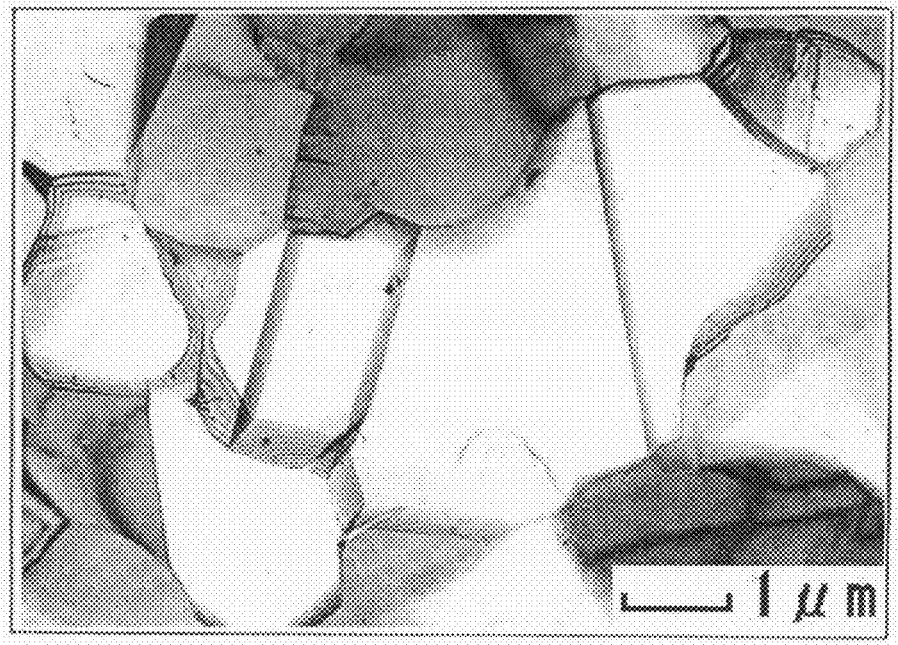
FIG. 3.
Figure 3:
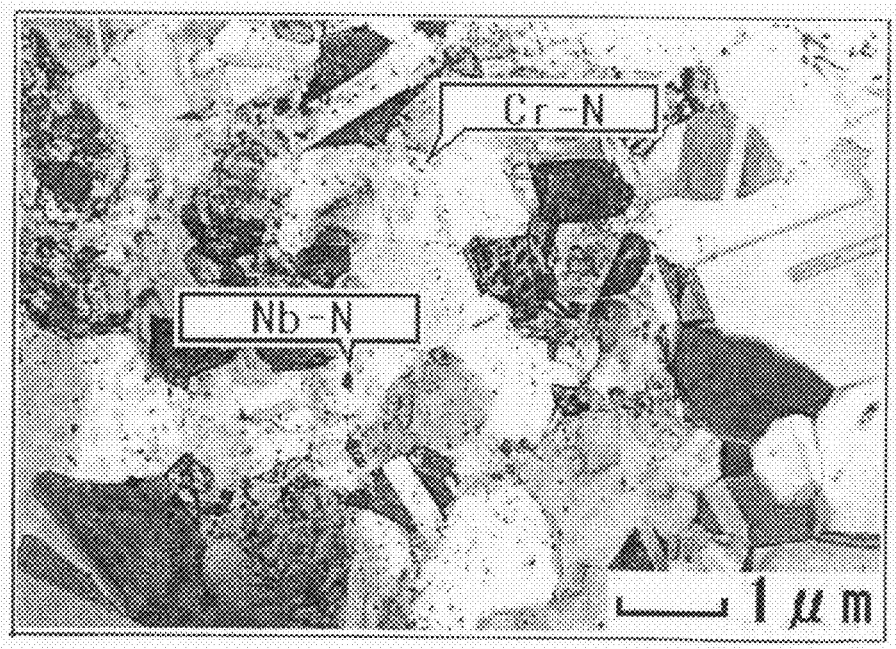

In addition, from FIG. 3, it was ascertained that by carrying out final heat treatment at a temperature which is sufficiently lower than the temperature of pre-heat treatment, fine nitrides are distributed at a high density in the vicinity of the sheet surface, and the crystal grain diameter of the matrix is refined to grain size number 1 or finer. In this observation, the presence of niobium nitride and chromium nitride were determined, but the majority was fine chromium nitride.

In order to highly accumulate fine nitrogen compounds in the surface layer portion annealing of a cold rolled steel sheet is carried out in two steps. In a first annealing step, heat treatment is carried out for at least 20 seconds in high-purity nitrogen or in a reducing atmosphere containing at least 5 volume % of nitrogen, with the atmosphere having a dew point of −40° C. or below, in a temperature range of 1000-1200° C. This is referred to as "pre-heat treatment". In the subsequent second annealing step, annealing is carried out at a temperature which is at least 50° C. lower than the heating temperature of the heat treatment in the first annealing step. This is referred to as "final heat treatment". The atmosphere in the final heat treatment is preferably a non-oxidizing atmosphere in order to guarantee the surface gloss necessary for stainless steel, but there are no particular other limitations.

The dew point of pre-heat treatment corresponds to the amount of moisture in the gas. It is thought that when it is high, a thick oxide film is formed and absorption of nitrogen is suppressed. As a result of experimental results, the dew point of the gas atmosphere during pre-heat treatment was made −40° C. or below. More preferably, it is −45° C. or below.

In order to achieve nitrogen absorption from the gas atmosphere, a gas atmosphere containing a nitrogen component is essentially employed. High-purity nitrogen gas may be used, but if it is added to a reducing gas (hydrogen or the like), in the same manner as by making the dew point −40° C. or below, oxide film formation on the surface of the material can be suppressed and nitrogen absorption can be promoted. Accordingly, nitrogen gas is preferably combined with a reducing gas atmosphere. A specific example of a reducing atmosphere is an $H_2$-containing $N_2$ atmosphere.

The final heat treatment is carried out at a temperature at least 50° C. lower than the pre-heat treatment in order to utilize the difference in the solubility limit of nitrogen at high temperatures and to precipitate nitrides. From experimental results, it was found that if the temperature difference is at least 50° C., the necessary nitrides precipitate, and the crystal grain diameter in the vicinity of sheet surface is refined compared to the interior thereof. More preferably, final annealing is carried out at a temperature at least 100° C. lower.

Other details of the heat treatment conditions are as follows.

When using a nitrogen-containing gas as an atmosphere for pre-heat treatment, the nitrogen concentration is at least 5 volume % and more preferably at least 10 volume %.

The temperature of pre-heat treatment is at least 1000° C. and at most 1200° C. and preferably at least 1050° C. The temperature of final annealing can be at least 50° C. lower than this, and preferably it is at least 850° C. and at most 1000° C. while being lower than the pre-heat treatment temperature.

The holding time at the above-described temperature in the case of pre-heat treatment is at least 20 seconds and preferably at most 10 minutes. More preferably it is at least 30 seconds. Such a length of time is necessary to absorb a sufficient amount of nitrogen by diffusion from the gas atmosphere. In the case of final heat treatment, it is at least 1 second and preferably at least 10 seconds.

Cooling after pre-heat treatment is preferably carried out as rapidly as possible within a permissible range in order to avoid precipitation of nitrides during cooling, to maintain a supersaturated solid solution state, and to promote uniform fine precipitation of nitrides in the final heat treatment. Specifically, according to actual results, it is at least 1° C. per second. More preferably, it is at least 2° C. per second.

Preferably, it is desirable to carry out cold working between pre-heat treatment and final heat treatment in order to introduce internal defects which become sites of precipitation of nitrides and to promote uniform fine precipitation of nitrides at the time of final heat treatment.

As for other conditions of heat treatment, conditions used in industrial practice may be used without modification. For example, prior to carrying out pre-heat treatment, a degreasing step and a pickling step can be carried out for the purpose of cleaning the sheet surface and removing an oxide film and the like.

After final heat treatment, in a preferred mode, ordinary temper rolling is carried out to obtain a stainless steel sheet having a prescribed thickness and worked structure. A steel sheet obtained in this manner is finished by suitable press working to form a gasket having a prescribed shape and dimensions.

EXAMPLES

In this example, cold rolled steel sheets having the compositions shown in Table 1 were used as test materials. By the method shown in Table 2, a starting material in the form of a cold rolled steel sheet was subjected to pre-heat treatment, cold rolling, final heat treatment, and temper rolling, and finally shaping was carried out to prepare a gasket.

Namely, the starting material for working was a mass-produced product made from SUS 301, 304, 301L or 304L prepared by steel melting, casting, hot and cold rolling, and annealing on an actual industrial production line. Test pieces were taken from the cold rolled steel sheets which had a sheet thickness of 1.2 mm. Using laboratory-class equipment, after absorption of nitrogen, pre-heat treatment was carried out to perform annealing. Cold rolling to a sheet thickness of around 0.5 mm was carried out followed by final heat treatment to perform annealing accompanied by precipitation of nitrides, and then temper rolling to a sheet thickness of around 0.2 mm were carried out.

Pre-heat treatment was carried out at 1050-1200° C. with a holding time of 180-600 seconds, and cooling was carried out at 2° C. per second. Final heat treatment was carried out at 850-1100° C. with a holding time of 30-45 seconds. The effect of the cooling speed was thought to be small, and in this experiment cooling was carried out at around 1° C. per second.

In addition, in this example, cold rolling was carried out between the two heat treatments. This cold rolling was carried out for the purpose of performing working to the thickness of the product sheet as well as to introduce internal defects which become sites of precipitation of nitrides and to promote uniform fine precipitation of nitrides at the time of final heat treatment.

The material which had been subjected to temper rolling was then formed into the gasket shape shown in FIGS. 1(a) and 1(b).

As already stated, FIGS. 1(a) and 1(b) are schematic explanatory views of a test piece showing the cross-sectional shape and dimensions of a bead 14 provided in the periphery of a bore 12.

A test piece was obtained after final heat treatment. It was investigated whether nitrides had uniformly and finely precipitated in the vicinity of the sheet surface, and the crystal grain size of the matrix in the vicinity of the sheet surface and in the central portion of the sheet thickness was investigated. In addition, a test piece was obtained after working to form a gasket, and the presence or absence of cracks in the bead surface and fatigue properties were investigated. The hardness after temper rolling was adjusted to be at the center level of the hardness of the H-type finished steel sheet shown in JIS G 4313 for each material. Specifically, it was adjusted to around Hv 460 in the case of SUS 301 and 301L and to around Hv 400 in the case of SUS 304 and 304L.

The results are shown in Table 3. An explanation of the symbols (*1, *2, *3) in Table 3 is as follows. Percent with respect to the gas atmosphere is volume percent.

*1 Atmosphere AX: 75% $H_2$+25% $N_2$
   Atmosphere AX': 50% $H_2$+50% $N_2$

*2 Presence or absence of nitrides:
   ⊚: This shows the case in which in the vicinity of the sheet surface, nitrides having a diameter of at least 10 nm are distributed with a high concentration of at least 200 per 100 $\mu m^2$ and at least two times that in the central portion of the sheet thickness.
   ○: This shows the case in which in the vicinity of the sheet surface, nitrides having a diameter of at least 20 nm are distributed with a high concentration of at least 200 per 100 $\mu m^2$ and at least two times that in the central portion of the sheet thickness.
   X: Refined nitrides are uniformly distributed with a low concentration over the entire sheet.
   XX: None

*3 Results of fatigue test
   ○: Good
   X: formation of penetrating cracks
   -: Not carried out For inventive materials 1-13, minute nitrides were distributed in a high concentration in the vicinity of the sheet surface, and the crystal grain size was grain size number 1 or larger than in the central portion of the sheet thickness (the crystal grain diameter was finer). They maintained the same hardness (strength) as for comparative materials 14-19, and they exhibited excellent bead workability when working to form a gasket. It was confirmed that they did not undergo fatigue failure even at an amplitude of 10 μm.

Explaining this more specifically, according to the results for inventive material 3, as a result of lowering the temperature of final heat treatment by at least 50° C. with respect to pre-heat treatment, nitrides were dispersed with a high concentration in the vicinity of the sheet surface compared to the central portion of the sheet thickness, and the grain size became grain size number 1 or greater (the grain diameter was finer). For all the inventive materials, it is thought that the difference between the crystal grain size in the vicinity of the sheet surface and the central portion of the sheet thickness fundamentally increased in accordance with the decrease in the final heat treatment temperature.

Namely, the necessary absorption of nitrogen is carried out by controlling the heating temperature for pre-heat treatment to 1000-1200° C. and the holding time to at least 20 seconds and adjusting the dew point of the gas atmosphere containing a nitrogen component to be −40° C. or below. Furthermore, from the results of inventive materials 4, 7, and 11, when the grain size in the interior of the sheet is made sufficiently fine, fatigue resistance further increases, and penetrating cracks are not formed even at an amplitude of 15 μm.

In contrast, with comparative materials 14 and 17-19 which underwent heat treatment at the same temperature, crystal grain refinement was not ascertained in the vicinity of the sheet surface. In addition, with comparative material 15 in which the gas atmosphere at the time of pre-heat treatment did not contain a nitrogen component, it is thought that there was no nitrogen absorption, and even when the final heat treatment temperature was lowered, crystal grain refinement did not occur in the vicinity of the sheet surface. In addition, with comparative material 16 for which the dew point of the gas atmosphere at the time of pre-heat treatment was −30° C., it is conjectured that due to the formation of an oxide film and the like, nitrogen absorption was inadequate, and crystal grain refinement in the vicinity of the sheet surface was also inadequate.

An additional explanation of the above-described test method is as follows.

Presence or Absence of Nitrides:

Using an SEM (scanning electron microscope), a test piece after final annealing was observed as to whether there were precipitates in the sheet surface portion and in the central portion of the sheet thickness. Using an associated analyzer, the presence of absence of nitrogen was ascertained. For test pieces for which it was determined that nitrogen was present, after removing by etching a base metal of the test piece each taken from the sheet surface portion and the central portion of the sheet thickness, a replica of an extract (a precipitate) was observed using a TEM (transmission electron microscope), and an average portion was photographed. Identification of the extracted material was carried out by structural analysis using electron beam diffraction.

Crystal Grain Diameter:

Using an optical microscope and an SEM (scanning electron microscope), the structure of the sheet surface portion and the central portion of the sheet thickness of test pieces after final annealing was observed. For a portion of the test pieces, the structure of a membrane taken from the sheet surface layer and the central portion of the sheet thickness was observed using a TEM. An average structure of each was photographed. Then, the crystal grain diameter and the crystal grain size were measured from each photograph.

Cracking of Bead Portion:

Using a test piece simulating a gasket like that shown in FIG. 1 which was prepared from a test material, the surface of the bead portion was observed using an SEM, and it was ascertained whether or not there were wrinkles or cracks (minute splits).

Fatigue Test:

Using a repeated compression tester, the presence or absence of penetrating cracks after $10^7$ repetitions with a constant amplitude in a test piece simulating a gasket like that shown in FIG. 1 was evaluated as ◯ or X.

FIG. 2 is a graph showing line analysis (the concentration distribution in the thickness direction of a sheet) of nitrogen obtained by an EPMA (electron probe microanalyzer) of inventive material 11 after the pre-heat treatment shown in Table 3.

FIGS. 3(a) and 3(b) are photographs taken with a transmission electron microscope (TEM) showing the structure of the vicinity of the sheet surface and the central portion of the sheet thickness of the same material after further carrying out cold rolling and final annealing.

From the results shown in FIG. 2, it can be seen that under pre-heat treatment conditions which can be realized in an actual production line, the nitrogen concentration up to about 200 μm from the surface of the sheet is high compared to the interior thereof. In addition, from FIG. 3, it was ascertained that by carrying out final heat treatment at a temperature which is sufficiently lower than for pre-heat treatment, in the vicinity of the sheet surface shown in FIG. 3(b), fine nitrides are distributed with a high density and the crystal gain diameter is refined to grain size number 1 or larger (refiner) compared to the central portion of the thickness shown in FIG. 3(a). In this observation, niobium nitride (Nb—N) and chromium nitride (Cr—N) were ascertained, but the largest portion was minute chromium nitride.

When the surface hardness after final annealing of Nos. 4 and 17 in Table 3 was measured under the following conditions, it was as follows.

| Test number | Material | Hardness |
|---|---|---|
| No. 4 | B | Hv 314 |
| No. 17 | B | Hv 190 |

Test Method:

The surface of a sheet with a sheet thickness of around 0.5 mm was measured with a Vickers hardness meter using a load of 1 kg (9.8 N).

The difference between the results listed above is based on the fact that in No. 4 which was an example of the present invention, strengthening by solid solution strengthening, precipitation strengthening, and crystal grain refinement due to nitrogen were additive.

TABLE 1

| | Components (wt %) | | | | | | | | |
|---|---|---|---|---|---|---|---|---|---|
| Symbol | C | Si | Mn | P | S | Ni | Cr | N | Other | Comments |
| A | 0.119 | 0.62 | 0.75 | 0.029 | 0.002 | 6.63 | 17.15 | 0.03 | — | Corresponding to SUS301 |
| B | 0.023 | 0.361 | 1.282 | 0.029 | 0.002 | 6.657 | 17.39 | 0.121 | Nb: 0.045 | Corresponding to SUS301L |
| C | 0.058 | 0.58 | 0.81 | 0.033 | 0.003 | 8.21 | 18.33 | 0.044 | — | Corresponding to SUS304 |
| D | 0.012 | 0.25 | 1.17 | 0.021 | 0.013 | 9.73 | 19.27 | 0.103 | — | Corresponding to SUS304L |

TABLE 2

Starting Material for working → Pre-heat treatment → Cold rolling → Final heat treatment → Temper rolling → Working to form gasket 5

TABLE 3

| Run No. | Material | Heat Treatment Conditions — Pre-heat Treatment Temp. (°C.) | Time (sec.) | Atmosphere *1 | Dew Point (°C.) | Final Heat Treatment Temp. (°C.) | Time (sec.) | After Final Heat Treatment Vicinity of Sheet surface — Presence or Absence of Nitrides *2 | Crystal Grain Size (G.S.No.) | Grain diameter (μm) |
|---|---|---|---|---|---|---|---|---|---|---|
| 1 | A | 1100 | 180 | AX | −50 | 1000 | 30 | ○ | 11.1 | 8.5 |
| 2 | A | 1150 | 180 | AX | −50 | 1000 | 30 | ○ | 11.2 | 8.2 |
| 3 | B | 1050 | 180 | AX | −50 | 1000 | 30 | ○ | 11.6 | 7.2 |
| 4 | B | 1100 | 180 | AX | −50 | 850 | 45 | ⊚ | 15.6 | 1.8 |
| 5 | B | 1100 | 180 | AX | −50 | 900 | 40 | ⊚ | 14.8 | 2.4 |
| 6 | B | 1100 | 180 | AX | −50 | 1000 | 30 | ○ | 11.9 | 6.5 |
| 7 | B | 1100 | 600 | AX | −50 | 850 | 45 | ⊚ | 16.1 | 1.5 |
| 8 | B | 1100 | 600 | AX' | −50 | 1000 | 30 | ○ | 12.5 | 5.2 |
| 9 | B | 1100 | 600 | AX | −40 | 1000 | 30 | ○ | 11.5 | 7.4 |
| 10 | B | 1150 | 180 | AX | −50 | 1000 | 30 | ○ | 12.1 | 6.0 |
| 11 | B | 1180 | 600 | AX' | −50 | 850 | 45 | ⊚ | 17.1 | 1.1 |
| 12 | C | 1100 | 180 | AX | −50 | 1000 | 30 | ○ | 10.7 | 9.8 |
| 13 | D | 1100 | 180 | AX | −50 | 1000 | 30 | ○ | 10.9 | 9.1 |
| 14 | A | 1100 | 180 | AX | −50 | 1100 | 30 | XX | 8.3 | 22.5 |
| 15 | A | 1100 | 180 | 100% Ar | −50 | 1000 | 30 | XX | 8.5 | 21.0 |
| 16 | A | 1100 | 600 | AX' | −30 | 1000 | 30 | XX | 8.9 | 18.3 |
| 17 | B | 1100 | 180 | AX | −50 | 1100 | 30 | X | 9.2 | 16.5 |
| 18 | C | 1100 | 180 | AX | −50 | 1100 | 30 | XX | 8.2 | 23.3 |
| 19 | D | 1100 | 180 | AX | −50 | 1100 | 30 | XX | 8.5 | 21.0 |

| Run No. | Material | After Final Heat Treatment Center of the Thickness — Crystal Grain Size (G.S.No.) | Grain diameter (μm) | After formation into Gaskets — Bead Surface | Fatigue*3 After 10⁷ Repetitions Amplitude 10 μm | Amplitude 15 μm | Remarks |
|---|---|---|---|---|---|---|---|
| 1 | A | 9.6 | 14.3 | Good | ○ | — | Invention Material |
| 2 | A | 9.4 | 15.3 | Good | ○ | X | |
| 3 | B | 10.5 | 10.5 | Good | ○ | — | |
| 4 | B | 14.1 | 3.0 | Good | ○ | ○ | |
| 5 | B | 13.2 | 4.1 | Good | ○ | — | |
| 6 | B | 10.5 | 10.5 | Good | ○ | X | |
| 7 | B | 14.2 | 2.9 | Good | ○ | ○ | |
| 8 | B | 10.4 | 10.9 | Good | ○ | — | |
| 9 | B | 10.4 | 10.9 | Good | ○ | — | |
| 10 | B | 10.2 | 11.6 | Good | ○ | — | |
| 11 | B | 14.6 | 2.5 | Good | ○ | ○ | |
| 12 | C | 9.2 | 16.5 | Good | ○ | X | |
| 13 | D | 9.3 | 15.9 | Good | ○ | X | |
| 14 | A | 8.5 | 21.0 | Cracks | X | X | Comparative Material |
| 15 | A | 8.5 | 21.0 | Cracks | X | — | |
| 16 | A | 8.4 | 21.7 | Cracks | X | — | |
| 17 | B | 9.1 | 17.0 | Wrinkles | X | X | |
| 18 | C | 8.2 | 23.3 | Cracks | X | — | |
| 19 | D | 8.3 | 22.5 | Cracks | X | — | |

The invention claimed is:

1. An austenitic stainless steel sheet for a gasket having been temper rolled and characterized in that at least in a region from the surface of the sheet up to 3 μm in the thickness direction of the sheet after temper rolling, nitrogen compounds having a diameter of at least 10 nm and at most 200 nm are present in an amount of at least 200 per 100 μm$^2$ and further characterized in that the number of nitrogen compounds having a diameter of at least 10 nm and at most 200 nm per 100 μm$^2$ in a region from the surface of the sheet up to 3 μm in the thickness direction of the sheet is at least two times the number of nitrogen compounds of this size in the central portion of the sheet thickness.

2. An austenitic stainless steel sheet for a gasket as set forth in claim 1 characterized in that the steel composition of the steel sheet is a composition corresponding to SUS301, SUS304, SUS301L, or SUS304L steel.

3. An austenitic stainless steel sheet for a gasket as set forth in claim 2 characterized by further including at least one of Ti, Nb, and V in a total amount of 0.02-0.5 mass %.

4. A gasket made from a stainless steel sheet as set forth in claim 2.

5. A gasket made from a stainless steel sheet as set forth in claim 3.

* * * * *